Aug. 21, 1934.                T. T. KENNAUGH                1,970,913
                              CONSTRUCTION OF SHIPS
                              Filed Sept. 26, 1931           4 Sheets-Sheet 1
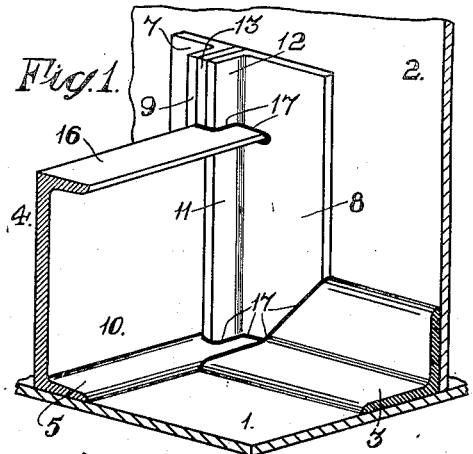
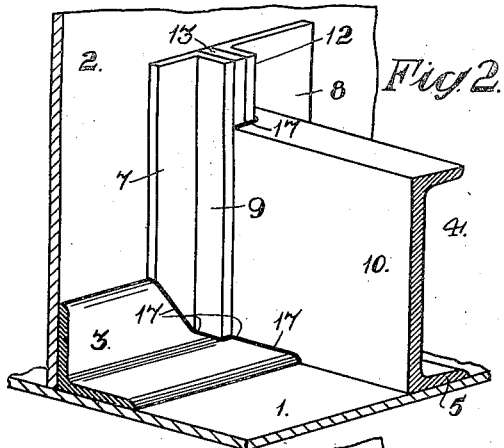
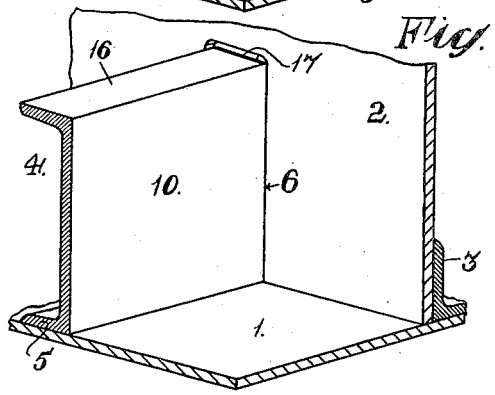
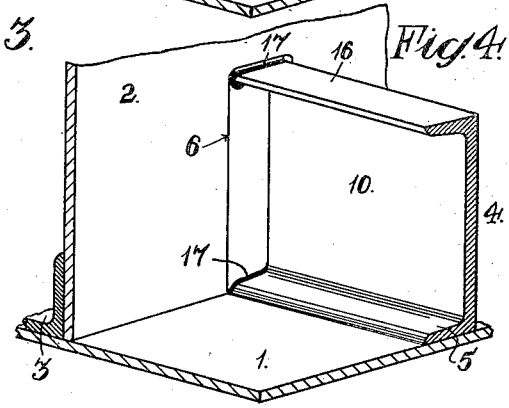
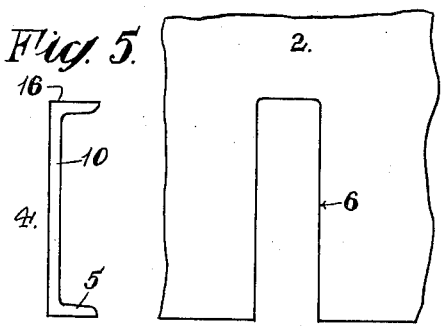
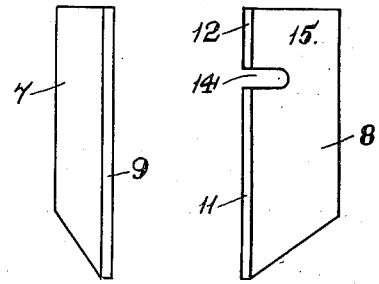
Inventor
T. T. Kennaugh
By Marion & Marion
Attorneys

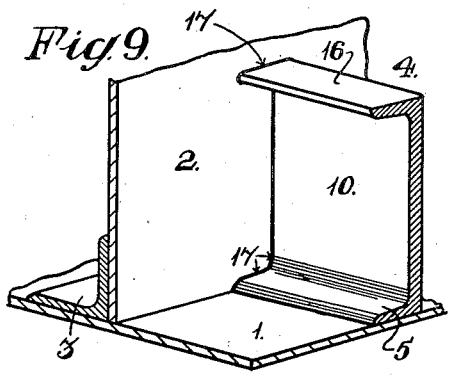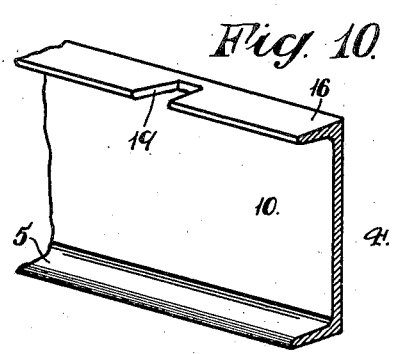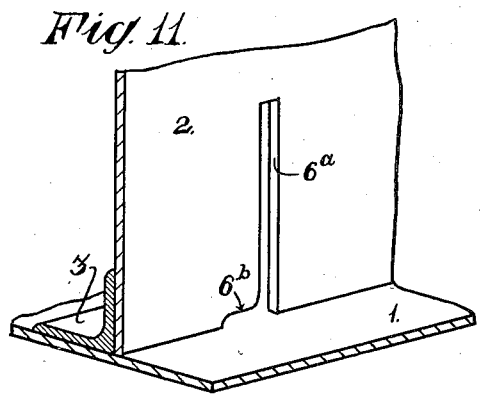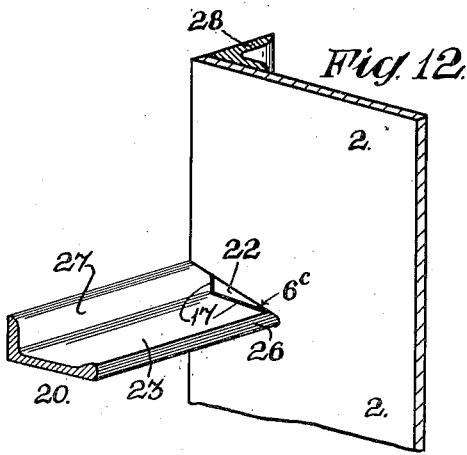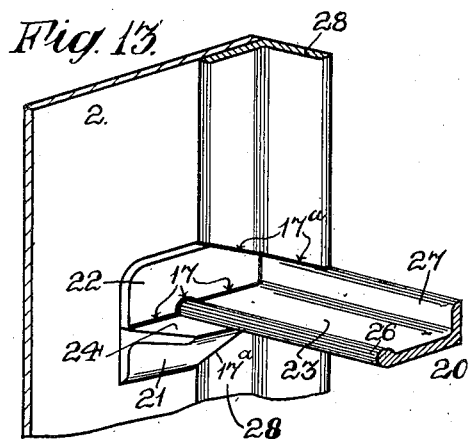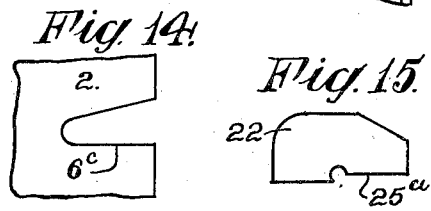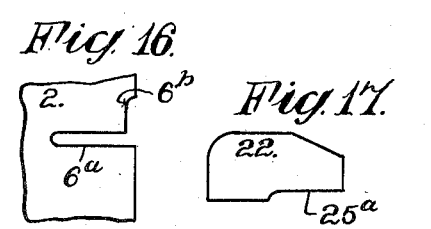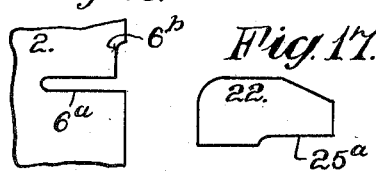

Aug. 21, 1934. T. T. KENNAUGH 1,970,913
CONSTRUCTION OF SHIPS
Filed Sept. 26, 1931 4 Sheets-Sheet 3
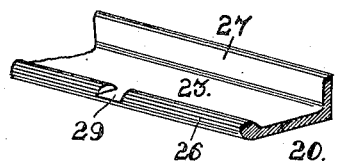
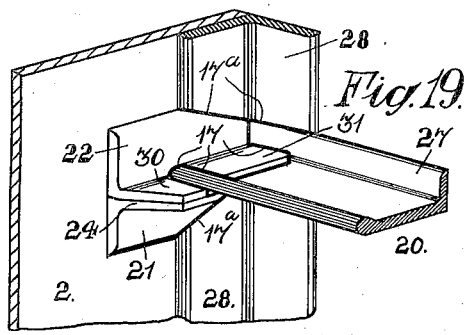
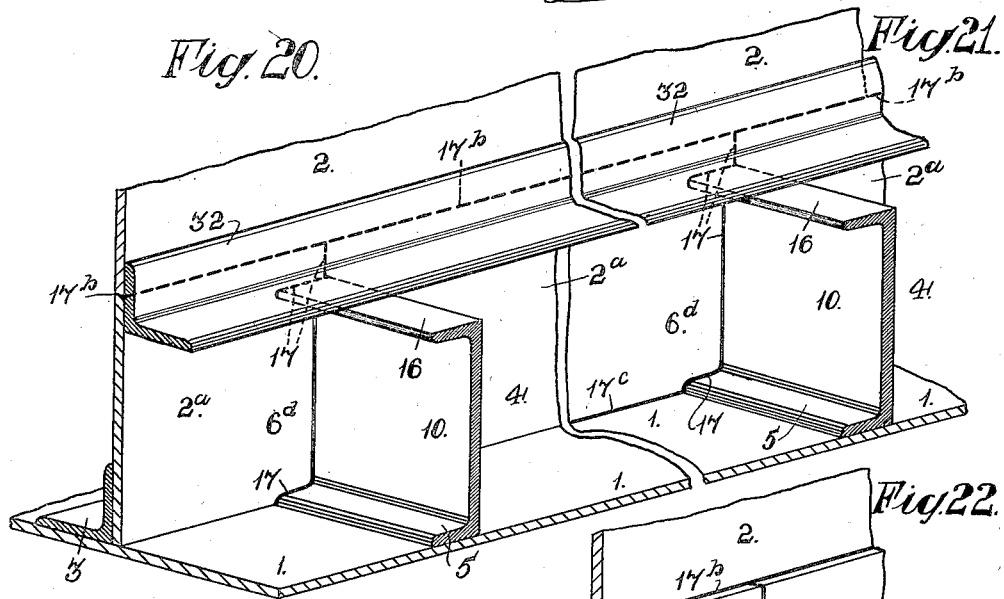
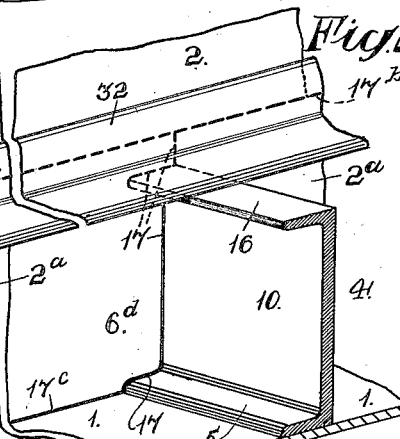
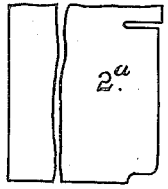
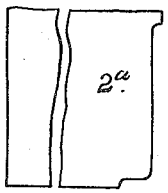
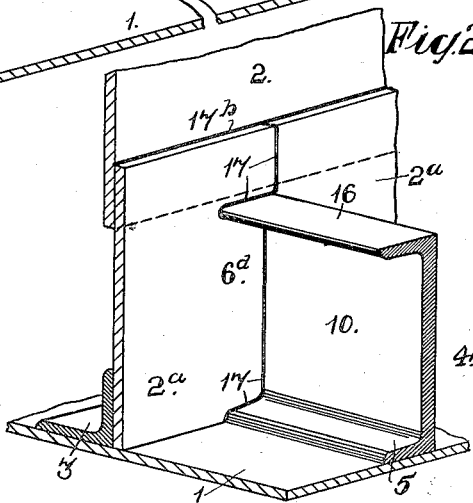
Inventor.
T. T. Kennaugh
By Marion & Marion
Attorneys

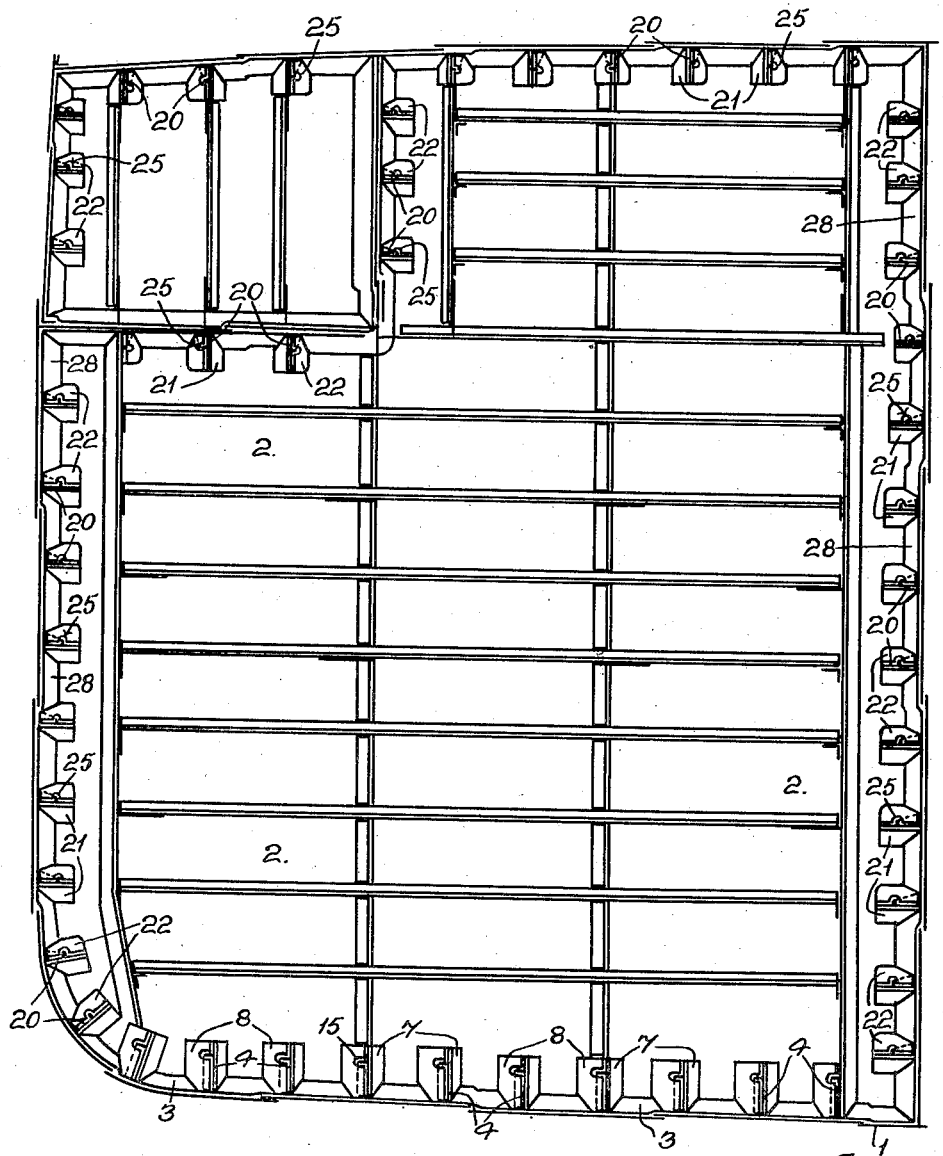

Patented Aug. 21, 1934

1,970,913

UNITED STATES PATENT OFFICE 1,970,913

CONSTRUCTION OF SHIPS

Thomas Trohear Kennaugh, Spital, England

Application September 26, 1931, Serial No. 565,318
In Great Britain December 2, 1930

5 Claims. (Cl. 114—79)

This invention relates to oil tankers and other liquid carrying vessels, and has for its object to provide a new or improved mode of construction whereby maximum stiffness and rigidity may be maintained with minimum weight of metal and with the least practicable number of separate sections or components, so that cost of construction and upkeep of such vessels may be appreciably reduced, the deadweight capacity increased, and likelihood of leakage or displacement of liquid cargo minimized.

In the construction of iron and steel vessels it has, heretofore, been proposed to connect the transverse bulkheads to the hull or shell plating by means of transverse frames of angle or other section each of which extends as a continuous or unbroken member along or around the sides and bottom of the shell, and to compose the spaced longitudinals of several sections which are stopped at the sides of the bulkheads and bound together at these points by means of continuous or unbroken longitudinal bulb angles each of which is attached to the inboard edges of aligned sections constituting a longitudinal frame (being thus spaced inwardly from the shell) and passes in a water-tight manner through the bulkheads by way of apertures which are closed by collars fitted around the bulb angles and secured to the bulkheads.

A liquid carrying vessel constructed in accordance with my invention is characterized in that the longitudinal frames directly secured to the shell are not stopped at the bulkheads as heretofore, but pass therethrough as unbroken or uninterrupted members to provide a continuous or unbroken shell connection, and the attachment of the bulkheads to the shell plating is effected by means of angle bars in short lengths fitted between the unbroken longitudinal frames and directly secured to the shell and bulkheads; and where said longitudinal frames pass through the bulkheads the apertures are made liquid-tight by welding or in other convenient manner.

I will further describe my invention with the aid of the accompanying sheets of explanatory drawings which illustrate, by way of examples only, several modes of carrying the same into effect.

In said drawings:—

Figs. 1 to 4, inclusive, are perspective views taken at different angles to each other of a fragment of a ship's hull structure sufficient to clearly illustrate one form of embodiment of the invention; and Figs. 5 to 8, inclusive, separately illustrate certain of the components constituting the structure shown in said Figs. 1 to 4.

Fig. 9 illustrates a further modification, certain of the components incorporated in Fig. 9 being also shown separately in Figs. 10 and 11.

Figs. 12 and 13 are perspective views similar to Figs. 3 and 2, respectively, but showing the mode of passing another form of continuous longitudinal member through a bulkhead; and Figs. 14 and 15 are detached views of certain of the parts shown in Figs. 12 and 13.

Figs. 16 and 17 are views similar to those depicted in Figs. 14 and 15 but showing slightly modified components; and Fig. 18 shows the mode of modifying the continuous longitudinal member illustrated in Figs. 12 and 13 to render it suitable for use with the parts shown in Figs. 16 and 17.

Fig. 19 illustrates a further modification of the form of structure shown in Figs. 12 and 13.

Figs. 20, 21 and 22 are perspective views illustrating further modifications of the structure depicted in Figs. 1 to 4, inclusive; and Figs. 23 and 24 are fragments of two forms of bulkheads suitable for use with any of the modified structures depicted in the preceding Figs. 20 to 22, inclusive.

Fig. 25 is a half midship section of a vessel constructed in accordance with the invention.

In the several views like characters of reference denote like or equivalent parts wherever they occur.

Referring first to Figs. 1 to 8 inclusive, 1 represents a portion of a keel or shell plate of a vessel, 2 a fragment of a vertical bulkhead which is rigidly attached to said shell plate 1 by means of angle bars 3 riveted or otherwise secured to the shell and bulkhead plates, and 4 indicates a part of a rolled channel-section longitudinal frame member or girder the lower horizontal flange 5 of which rests upon and is riveted or otherwise fixedly attached to said shell plate 1.

Said stiffening member or girder 4, as shown, extends through the bulkhead 2 from one side thereof to the other by way of a comparatively wide rectangular slot or notch 6 of appropriate length provided for the purpose in the bulkhead. Thus the stiffener member forms an unbroken or uninterrupted longitudinal which may be continued—as a single frame member—through any desired number of similarly slotted bulkheads or like members of the structure.

Said longitudinals are, of course, arranged in suitably spaced relationship so that they pass unbroken or uninterrupted through the bulkheads to maintain an unbroken shell connection and the attachment of the bulkheads to the shell plating is effected by the angle bars 3 which are arranged in short lengths and fitted between the unbroken longitudinals.

Liquid-tightness at the point where said longitudinal 4 passes through the slot or notch 6 in bulkhead 2 may be provided by welding, angle or plate collars, or by a combination of welding and collars. In the particular example illustrated, however, two angle collars designated 7, 8, respectively, are welded or/and riveted or otherwise secured to the bulkhead so that a vertical flange 9 of collar 7 abuts against one side of the standing flange 10 of the longitudinal 4 and a lower flange 11 of collar 8 abuts against the other side of the standing flange of the longitudinal. Between the upper flange 12 of said last mentioned collar and the upper extremity of said flange 9 of the other collar a filler piece 13 of suitable material is anchored: and provided in the collar 8 (so as to form a continuation of the gap 14 between the respective flanges 11, 12 thereof) is a horizontal slot or notch 15 into which, and said gap 14, the upper horizontal flange 16 of the longitudinal frame member or girder 4 extends as shown in Fig. 1. When said collars 7, 8 are fixed in position the respective parts forming the structure are welded together along the several meeting edges where indicated by the thickened lines 17 to form a strong, rigid and liquid-tight framework.

It will, of course, be understood that in practice all the longitudinals or girders of a hull structure will extend, as uninterrupted longitudinals, continuously through appropriately spaced alined slots or notches in the several bulkheads and may be jointed to the bulkheads in the manner just described or in any other convenient manner.

In the modification illustrated in Figs. 9 to 11, inclusive, a narrow slot or notch 6a is formed in the bulkhead 2 for the reception of the standing flange 10 of the channel-section longitudinal or girder 4 and the upper horizontal flange 16 of the continuous longitudinal is also formed with a cooperating slot or notch 19 into which a portion of the bulkhead adjacent to the notch thereof extends: the lower horizontal flange 5 of the longitudinal projects through a lateral groove or recess 6b in the lower edge of the bulkhead. Thus said narrow slot or notch 6a, 6b in the bulkhead is of angle or L-shape or configuration and receives a similarly shaped slotted part of the unbroken longitudinal which consequently lies close up to or flush against the walls or edges bordering the bulkhead slot or notch. In this arrangement, the longitudinal 4 may be directly welded, as indicated at 17, to the notched portion of the bulkhead; or the angle collars of the kind referred to with reference to Figs. 1 to 8, inclusive, or plate collars, may be welded or/and riveted or otherwise secured to the respective parts to ensure liquid-tightness at the point where the longitudinal passes through bulkhead 2.

Referring now to the construction illustrated in Figs. 12 to 15, inclusive, 20 generally indicates a bulb angle longitudinal frame member or girder which passes through the bulkhead 2 by way of a tapered or substantially triangular slot or notch 6c formed therein, and a liquid-tight joint is made at the part where said bulb angle longitudinal passes through the bulkhead notch by means of angle and plate collars 21, 22 respectively, which are welded, riveted, or otherwise secured to the bulkhead 2. In this modification the flange 23 of the continuous or uninterrupted bulb angle longitudinal or girder is attached to the horizontal flange 24 of the angle collar 21, while the lower edge of the upper plate collar 22 is appropriately recessed at 25 to accommodate said flange 23 and the bulb portion 26 of the angle girder, the parts being welded together where indicated at 17 to provide the liquid-tight joint. The vertical angle bar 28 is also separated and welded to the longitudinal angle member or girder 20 and the collars 21, 22 as shown at 17a.

In the modification just described, the standing flange 27 of the bulb angle longitudinal 20 fits into the outer or wider end of the tapered slot or notch 6c in bulkhead 2. If so desired, however,—see Figs. 16 to 18 inclusive—a narrow slot or notch 6a, 6b similar in shape to that shown in Fig. 11 may be formed in the bulkhead to receive that part of a bulb angle longitudinal or girder which is correspondingly shaped by cutting a slot or notch 29 in the bulb 26, and the recess 25a in the plate collar 22 is shaped accordingly: thus the edge of the bulkhead lies flush against the upstanding flange 27 of the angle longitudinal. In this case, of course, the longitudinal itself may be directly welded to the bulkhead to make the liquid-tight joint, or, alternatively, plate or angle collars may be riveted or/and welded to the respective parts to make the joint.

The arrangement illustrated in Fig. 19 differs from those described with reference to Figs. 12 to 18 inclusive, only in respect to the upper collar 22, which, in this instance, is provided with two horizontal flanges 30, 31 which are respectively attached to the horizontal flange 24 of angle collar 21 and the horizontal flange 23 of the angle longitudinal or girder 20 in order to provide additional support for the longitudinal. A continuous or uninterrupted longitudinal provided with a notch, as 29, or a longitudinal having an unbroken bulb may be used in this example to attain the end in view.

Referring now to the construction illustrated in Fig. 20, it will be seen that the continuous longitudinal 4 attached to the shell plating 1 extends through a slot or notch 6d formed or provided in the bulkhead 2 between appropriately formed adjacent edges of the division or like plates 2a which are welded at 17b to the portion 2 of the bulkhead proper to form or constitute integral lower portions of the bulkhead. In this form of structure, division or like plates of the kind illustrated in Fig. 23 may be employed in combination with continuous channel section longitudinals or girders, or the like, or, alternatively, division or like plates of the kind shown in Fig. 24 may be employed in combination with slotted or notched longitudinals such as shown in Fig. 10, and the adjacent edges of said bulkhead division plates 2a lie close against the longitudinals and are welded thereto where indicated at 16. In this construction also, the adjacent end portions of the bulkhead 2 and the division plates thereof bear against a horizontal angle stiffening bar 32 which is welded or/and riveted or otherwise secured to the upper horizontal flange 16 to rigidly support the bulkhead.

The construction illustrated in Fig. 21 is identical in all respects to the arrangement just described with the exception that the lower edges of the division plate portions 2a of the bulkhead 2 are also welded at 17c to the shell plate 1.

The arrangement shown in Fig. 22 is likewise similar in construction to that illustrated in Fig. 20, the only exception in this case being the lapping of the lower part of the bulkhead proper over the adjacent upper portions of the division or like plates 2a thereof in lieu of providing a butt joint as is depicted in Fig. 20.

Whilst the invention has been more particularly described in its application to bottom and side longitudinal frame members or girders it is to be clearly understood that it is equally applicable to other frame members such, for instance, as the centre line, deck, trunk top and trunk side longitudinals of a ship's hull structure. Further, the arrangement of passing the longitudinals through the bulkheads is also appliable to cases where longitudinal framing is used at the bottom or/and decks of an oil tanker or cargo vessel in conjunction with any known construction of transverse side framing.

What I claim as my invention and desire to secure by Letters Patent is:—

1. In a liquid carrying vessel constructed according to the longitudinal system wherein flanged longitudinal frames for the side and bottom shell platings pass as continuous members through spaced notches in transverse bulkheads, a combination of transverse frames and collars welded in position to close in a liquid tight manner the joints between edges of the transverse bulkheads and the shell plating and the spaced notches of the bulkheads, said transverse frames being composed of a series of short angle bars fitted between the longitudinals and having their respective flanges directly secured throughout their lengths to edge portions of the bulkheads and adjacent portions of the shell plating and welded at their ends to adjacent portions of the collars, and said collars being constructed to embrace said longitudinal frames at the bulkhead notches and having flange portions welded together and to the flanges of the longitudinal frames and further flange portions welded to the bulkheads, said flanges of the collars being also welded at their ends to the ends of the respective flanges of the angle bars.

2. A floating vessel in which the longitudinal frames of the hull structure pass continuously through the bulkheads as uninterrupted members to provide an unbroken shell connection, and the bulkheads are attached to the shell plating by means of angle bars in short lengths fitted between said unbroken longitudinal frames and attached to the shell and bulkheads; said unbroken longitudinal members of channel section having notches in their horizontal flanges and extending continuously through the bulkheads by way of angle shaped notches therein which accommodate said notched portions of the longitudinal members, and said longitudinal members being attached to said bulkheads by collars secured in required position.

3. A floating vessel in which the longitudinal frames of the hull structure pass continuously through the bulkheads as uninterrupted members to provide an unbroken shell connection, and the bulkheads are attached to the shell plating by means of angle bars in short lengths fitted between said unbroken longitudinal frames and attached to the shell and bulkheads; said unbroken longitudinal members of bulb-angle section having notches in their bulb portions and extending continuously through the bulkheads by way of angle shaped notches therein which accommodate said notched portions of the longitudinal members, and said longitudinal members being attached to said bulkheads by collars secured in required positions.

4. A floating vessel in which the longitudinal frames of the hull structure pass continuously through the bulkheads as uninterrupted members to provide an unbroken shell connection, and the bulkheads are attached to the shell plating by means of angle bars in short lengths fitted between said unbroken longitudinal frames and attached to the shell and bulkheads; said unbroken longitudinal members of channel section and extending continuously through channel shaped notches created by appropriately formed adjacent edges of division plates secured to and constituting integral portions of the bulkheads.

5. A floating vessel in which the longitudinal frames of the hull structure pass continuously through the bulkheads as uninterrupted members to provide an unbroken shell connection, and the bulkheads are attached to the shell plating by means of angle bars in short lengths fitted between said unbroken longitudinal frames and attached to the shell and bulkheads; said unbroken longitudinal members of channel section having notches in their horizontal flanges and extending continuously through the bulkheads by way of angle shaped notches which accommodate said notched portions of the longitudinal members and are created by appropriately formed adjacent edges of division plates secured to and constituting integral portions of the bulkheads.

THOMAS TROHEAR KENNAUGH.